April 18, 1950 S. REY 2,504,587

SOUND REPRODUCING APPARATUS

Filed May 14, 1946 2 Sheets-Sheet 1

Inventor

Secundino Rey,

By [signature]

Attorney

April 18, 1950 S. REY 2,504,587

SOUND REPRODUCING APPARATUS

Filed May 14, 1946 2 Sheets-Sheet 2

Inventor

Secundino Rey,

By Emory L. Groff

Attorney

Patented Apr. 18, 1950 2,504,587

UNITED STATES PATENT OFFICE 2,504,587

SOUND REPRODUCING APPARATUS

Secundino Rey, Ramos Mejia, Argentina

Application May 14, 1946, Serial No. 669,476

6 Claims. (Cl. 242—55)

The present invention refers to improvements in sound reproducing apparatus wherein sounds are reproduced from corresponding inscriptions or registrations on flexible tape, the main object of the invention being the application of certain improvements to said apparatus, said improvements implying evident functional and practical advantages in the employment of said apparatus.

The improvement object of the present invention, is characterized principally by the fact of its providing said apparatus with directly or indirectly controllable means to bring about at will the stoppage and inversion of the displacement direction of the sound carrying tape.

By carrying out the improvements which are object of this invention, remarkable improvement may be attained in the reproduction, and consequent perception, of the sounds registered by the flexible tape, inasmuch as by means of a button or pedal-operated mechanism, the movement of said tape can be brought to a stop at a certain instant and its displacement inverted in order to repeat, as often as necessary, words, phrases or sentences that may have not been understood correctly.

The device which characterizes the improvement object of this invention offers, apart from what has been specified above, the advantage of being very simple, safe, cheap and automatic, inasmuch as displacement stoppage or inversion is effected through electromagnetic action controllable by a simple contact button or other adequate switching device.

In some cases said button can be replaced, to the same end, by a pedal-action switch, which is especially advantageous, for example, in cases in which the sounds registered by the flexible tape are to be transcribed on a typewriter as soon as they are reproduced by the apparatus.

Evidently, the advantages offered by a reproducer which has been improved in accordance with the present invention, are very considerable, especially in cases where sounds are registered on telegraphic tape, the transcription of which is effected by means of typewriters, implying the need for frequent stoppages of the sound carrying tape, and even the inversion of its run in order to be able to repeat words registered thereon, it frequently happens that operators, accustomed to memorize some words forget others, which consequently must be repeated.

Another of the advantages characterizing the device which is the outstanding feature of the improvement object of this invention, resides in the fact that it permits resumption or detention of the sound carrying tape without it being necessary to stop the displacement control means of said tape, a feature which differentiates a reproducer of this type from all other known types, and which furthermore avoids loss of time, inasmuch as after the tape has been stopped, its displacement may be taken up by the mechanism at an adequate speed, which allows to interpret correctly the first words or sounds, whereas should the flexible tape start to move slowly, gathering speed gradually until reaching normal transmission velocity, the first sounds would be distorted, thus hindering proper perception of same and giving rise to considerable loss of time in transmission.

Summarizing, the device which characterizes the improvement object of this invention, allows instantaneous detention or inversion of the sound carrying tape displacement without appreciable loss of speed, all of which takes place automatically, being controlled by means of a button or hand-operated switch, or by means of a pedal arrangement.

The invention further contemplates other accessory objects that will be made clear during the course of the present description.

In order that the present invention may be more fully understood and put into practice, a preferred embodiment of same has been illustrated in attached drawings, in which.

Like numbers represent like parts in the several figures of the drawings.

Figures 1, 2:
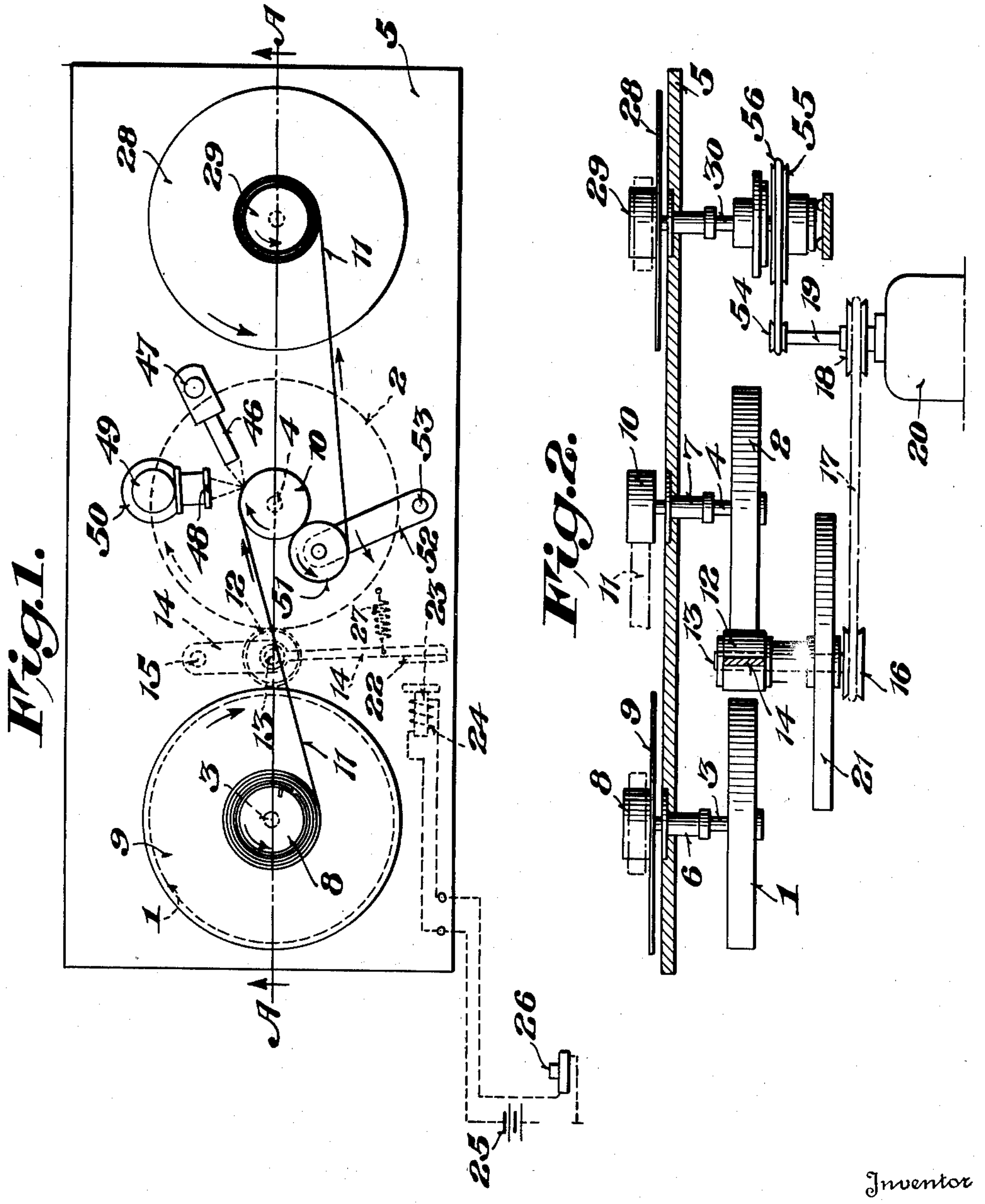
Figure 1 is a plan view of a sound reproducer, provided with the improvements object of this invention, means being shown for inverting the displacement direction of the flexible tape.
Figure 2 is a lengthwise sectional cut and end-view of the same reproducer, through line A—A of the former figure.

In the embodiment shown, the sound reproducer improved in accordance with the present invention, is constituted mainly by two wheels or pulleys 1 and 2, their edges being straight and wide and their respective shafts 3 and 4 passing through top-plate 5 of the frame of the receiving apparatus, protruding upwardly through same through bushings 6 and 7 to connect respectively with the winding or unwinding reel 8, to which is attached plate 9, and to roller 10, for the drawing of sound carrying tape 11.

Figure 3:
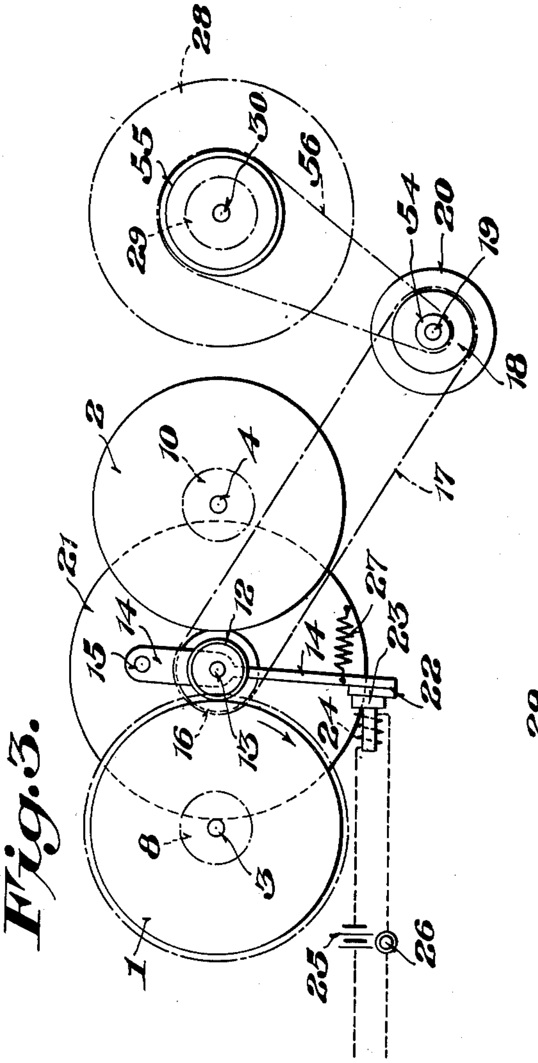
Figure 3 is a plan view of another diagrammatic detail, showing means for inverting the sound carrying tape displacement, and, finally.

In Figures 1 through 3 can be seen, furthermore, that between said wheels or pulleys 1 and 2, there is adapted to roller 12 whose periphery has been furnished with a band of rubber or similar material, arranged at a very small distance from the periphery of said wheels or pulleys, and capable of coming alternatively in contact with one or the other of same, to which end, shaft 13 of said roller is rotatably supported by a lever 14, which in turn is rotatably supported at one of its ends by means of a vertical shaft 15 projecting from the lower portion of top-plate 5. In order to reduce to a minimum the effects of friction between shaft 13 and supporting lever 14, said shaft is supported in its position by means of a couple of roller bearings, not shown.

In turn, on the shaft 13 of roller 12 a small pulley 16 is adapted which, through an appropriate belt 17, receives a rotation movement from another similar pulley 18, attached to shaft 19 of a motor or similar arrangement 20, whose object is to transmit to said roller 12 a movement of rotation in the same direction and at the same speed, said speed being practically kept constant by means of a regulating flywheel 21, fixedly adapted to the same shaft 13 as said roller.

From the figures it may be seen, furthermore, that on the end of lever 14, opposite to that of its rotation shaft 15, there is adapted a metal armature 22, capable of attraction by core 23 of electromagnet 24, this latter fed by an adequate battery 25, in the circuit of which there is inserted a button 26 or other type of hand or pedal controlled switch.

Normally, armature 22 is kept separated from electromagnet-core 23, as shown in Figure 1, due to the action of coilspring 27.

On top-plate 5 there is also adapted a second plate 28 on which is arranged a bobbin 29, both being in turn supported by vertical shaft 30, capable of being connected or disconnected at will from the motor mechanism, in order to be put in motion or to be stopped, by means of another electromagnet control device, governable by a hand-operated switch, or by a pedal arrangement. To that purpose, the lower end of said shaft 30, passes through central orifice 31 of arm 32 one extreme of which is hingedly connected through shaft 33 to the lower end of spindle 34 projecting from the lower face of top-plate 5, the opposite end of which arm rests on the free end of regulating-screw 35, suitably threaded through terminal elbow of support 36, fixed to the lower face of said plate 5 and forming part of the frame.

Figure 4:
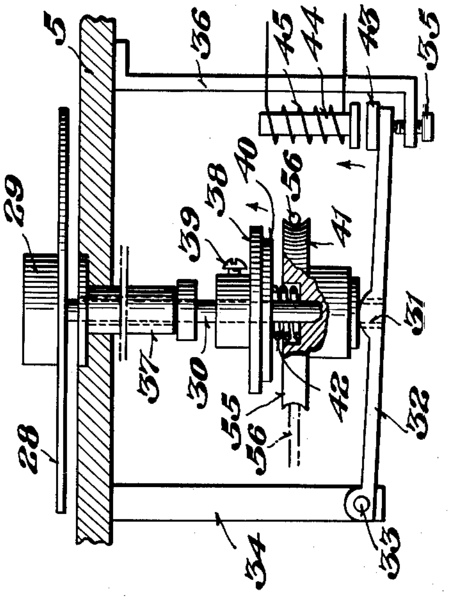
Figure 4 is an endwise cut, seen frontally, of the means provided for the connection and disconnection of the winding spool for the sound-carrying tape, seen in its inoperative position.

Also noticeable in Figure 4 is the fact that said shaft 30 passes vertically through bushing 37 and carries, at an adequate point, plate or disc 38, which is fixed to said shaft by means of a screw 39 or similar element, the lower face of said plate or disc having fixedly adapted to it a friction element, such as a cloth disc 40, or similar arrangement.

In turn, in a position adjacent to the lower face of said disc or plate 38, there is adapted a second plate or disc 41, loosely mounted on said shaft 30 and normally kept separated from adjacent disc 38 by means of a spring or similar element 42, conveniently placed between both.

By suitably turning screw 35, described above, the degree of separation between said discs 38 and 41 can be regulated at will.

The same figure shows, furthermore, that on the free end of arm 32 a metal armature 43 is adapted, attractable by core 44 of electromagnet 45 fed by a battery (not shown) and in whose circuit there is inserted a button similar to element 26, described in the foregoing, or other hand or pedal operated switching device.

The reproducing apparatus improved in accordance with the present invention includes furthermore, in combined fashion, a series of elements that are common to apparatus of this kind and which are arranged above the top-face of plate 5, and comprehending a lantern assembly constituted by an optical system 46 and a source of light 47 producing a narrow and long beam of light which falls upon the sound bearing face of flexible tape 11, to be reflected towards opening 48 of photoelectric cell 49, this assembly being duly insulated from outside light sources by means of a small metal protecting box 50.

There is adapted, in turn, in a position adjacent to guide roller 10, a second roller 51, made of rubber or other elastic material, with the purpose of keeping flexible tape 11 properly tensioned, thus securing the perfect adherence of said tape against the periphery of said roller guide 10. To that end, said roller 51 is rotatably mounted at the end of lever 52, capable of turning round fixed shaft 53, said lever normally tending towards the direction indicated by the arrow in Figure 1, owing to the action of a spring or similar arrangement, not shown due to the fact that it is commonly encountered.

In order to use the reproducing apparatus as improved in accordance with the present invention, the steps to be taken are as follows:

Flexible tape 11, of paper or similar material, whereon the sounds to be reproduced are registered and which has been properly conditioned on spool 8—as shown in detail in Figure 1, is made to pass over one of the sides of guide roller 10, whose mission is to control the movement of said tape and from where it is passed over the side of tension roller 51, whose object is to secure perfect tensioning of said tape and consequently proper adherence of same to adjacent roller 10; from said roller 51, tape 11 is taken up finally by end-reel 29, attached to plate 28.

Under normal working conditions, the circuit of electromagnet 24 is kept open, core 23 of said electromagnet consequently exerting no force against armature 22 and therefore lever 14, acted upon by spring 27, is in the position indicated by dotted lines in Figure 1, rubber roller 12 thereby being put in contact with the edge of plate 2.

Simultaneously, the circuit of electromagnet 45 will be kept closed, as consequence of which armature 43 will be attracted upwardly, together with arm 32, so that discs or plates 38 and 41 will make contact with one another by means of cloth disc 40, a perfect connection being made between both.

It is evident that under these conditions the rotating movement of pulley 18 and motor 20 is transmitted by means of belt 17 to pulley 16 and shaft 13, which supports flywheel 21 and roller 12, this latter thereby turning at a practically uniform speed in the direction indicated by the arrow in Figure 1; the rotating movement of said roller 12 is in turn transmitted by friction to plate 2, affixed to shaft 4, to which roller 10 is attached, which in turn controls the speed of flexible tape 11. For this position, roller 12 is kept at a distance from the edge of plate 1, which is affixed to shaft 3 supporting roller 8, which turns loosely in response to the movements of tape 11.

Simultaneously, the movement of shaft 19 of motor 20 is transmitted, by means of pulleys 54 and 55 and belt 56, to shaft 30, forming integral part of plate 28 to which is affixed spool 29, which last element will then turn in the direction indicated by the arrow in Figure 1, flexible tape 11 being thus wound on itself, said tape being consequently obliged to move in the direction also indicated by the corresponding arrows, which is that of the normal advancing movement, confronting in its displacement the optical system made up of lamp 47 and photoelectric cell 49, from which originates the reproduction of sounds registered on the tape.

If under these conditions it is desired to stop the motion of sound bearing tape 11, the device which acts upon the circuit of electromagnet 45 of Figure 4, is operated, thus causing said circuit to open, whereby core 44 of said electromagnet will cease to be energized and consequently cease to exert a pull on armature 43, thus permitting the descent of arm 32 and corresponding plate or disc 41, owing to the simple action of spring 42, consequent disconnection between said plate and adjacent element 38 taking place, which causes shaft 30 immediately to stop, as well as spool 29 affixed to it, flexible tape 11, which was before being pulled by said spool, thus ceasing in its motion.

If, once flexible tape 11 has been stopped, in the manner explained, it is desired to invert the running direction of said tape, in order to repeat the sounds registered on same or for other reasons, button or switch 26, of Figure 1, will be operated, thus bringing about closure of circuit of electromagnet 24, whose core 23 will attract armature 22, and arm 14 will therefore turn around its shaft 15, counteracting the resistance opposed by spring 27, as a consequence of which rubber roller 12 will become separated from the edge of plate 2 in order to come into frictional contact with the edge of plate 1, as shown in detail in Figure 3.

From this moment, said plate 2, which forms integral part of roller 10, so as to guide the flexible tape, turns loosely, while plate 1, supporting spool 8 will be obliged to rotate in the direction indicated by the arrow in Figure 3, owing to friction exercised on said plate by roller 12, in consequence of which said flexible tape will be obliged to move in a direction opposed to its normal motion, at a practically uniform speed owing to action of flywheel 21, forming integral part with said roller. During this reversal movement, spool 29 and the elements affixed to it, rotates loosely, owing to the fact that previously discs or plates 38 and 41 have become uncoupled.

In order to recommence normal running of the flexible band or tape, the circuit of electromagnet 24 will be again opened, allowing the force exerted by spring 27 to establish again contact between rubber roller 12 and plate 2, integral with guiding spool 10, after which electromagnet 45 will be again energized and thus, through core 44 and armature 43, causing the free end of arm 32 to lift and thus putting discs or plates 38 and 41, through disc 40, again in frictional contact, shaft 30 being put again in motion together with its affixed spool 29, as a consequence of which flexible tape 11 will be forced to move again in the direction indicated by the arrows in Figure 1.

Apart from the advantages herein specified, the reproducer equipped with the improvements object of the present invention, offers the undoubted convenience that in order to effect changes of running direction or the stoppage of the tape, it is not necessary to reverse the rotation of the motor, nor to bring about its detention.

Again, as rubber roller 12 and the flywheel 21 forming integral part of same, run always at the same speed, even in case the flexible tape is stopped or has reversed its running direction, it is possible to effect instantaneous change of the tape's running direction, without thereby inconveniencing in the least the perfect perception of sounds registered on same.

The invention as herein set forth may be clearly understood, no further explanations being required by those versed in the art.

Evidently, divers modifications of build and detail may be introduced without thereby departing from the nature of the present invention, which is clearly defined in the following claims.

I claim:

1. In apparatus reproducing sounds inscribed or registered on flexible tape, the combination comprising a frame, a winding reel for the tape journaled in said frame, driven means rigid with said winding reel, a guide roller for the tape rotatably mounted in said frame, a second driven means rigid with said guide roller, driving means movably mounted in said frame means normally urging said driving means to engagement with said second driven means of said guide roller, motor means for operating said driving means, electromagnetic means for moving said driving means to engage said first driven means, a second winding reel for said tape rotatably mounted in said frame, a clutch having a member rigid with said second reel and a second member driven by said motor means, means for urging said clutch members apart, and means for moving said clutch members to mutual engagement.

2. In apparatus reproducing sounds inscribed or registered on flexible tape, the combination comprising a frame, a winding reel for the tape journaled in said frame, pulley means rigid with said winding reel, a guide roller for the tape rotatably mounted in said frame, a second pulley means rigid with said guide roller, driving means movably mounted in said frame, means normally urging said driving means to engagement with said second pulley means, motor means for operating said driving means, electromagnetic means for moving said driving means to engage said first pulley means, a second winding reel for said tape rotatably mounted in said frame, a clutch having a member rigid with said second reel and a second member driven by said motor means, means for urging said clutch members apart, and means for moving said clutch members to mutual engagement.

3. In apparatus reproducing sounds inscribed or registered on flexible tape, the combination comprising a frame, a winding reel for the tape journaled in said frame, driven means rigid with said winding reel, a guide roller for the tape rotatably mounted in said frame, a second driven means rigid with said guide roller, driving means swingably mounted in said frame means normally urging said driving means to engagement with said second driven means of said guide roller, motor means for operating said driving means, electromagnetic means for moving said driving means to engage said first driven means, a second winding reel for said tape rotatably mounted in said frame, a clutch having a member rigid with said second reel and a second member driven by said motor means, means for urging said clutch members apart, and means for moving said clutch members to mutual engagement.

4. In apparatus reproducing sounds inscribed or registered on flexible tape, the combination comprising a frame, a winding reel for the tape journaled in said frame, pulley means rigid with said winding reel, a guide roller for the tape rotatably mounted in said frame, a second pulley means rigid with said guide roller, driving means swingably mounted in said frame, means normally urging said driving means to engagement with said second pulley means, motor means for operating said driving means, electromagnetic means for moving said driving means to engage said first pulley means, a second winding reel for said tape rotatably mounted in said frame, a clutch having a member rigid with said second reel and a second member driven by said motor means, means for urging said clutch members apart, and means for moving said clutch members to mutual engagement.

5. In apparatus reproducing sounds inscribed or registered on flexible tape, the combination comprising a frame, a winding reel for the tape journaled in said frame, driven means rigid with said winding reel, a guide roller for the tape rotatably mounted in said frame, a second driven means rigid with said guide roller, driving means movably mounted in said frame means normally urging said driving means to engagement with said second driven means by said guide roller, motor means for operating said driving means, electromagnetic means for moving said driving means to engage said first driven means, a tension roller swingably mounted on said frame and forcing the tape against said guide roller, a second winding reel for said tape rotatably mounted in said frame, a clutch having a member rigid with said second reel and a second member driven by said motor means, means for urging said clutch members apart, and means for moving said clutch members to mutual engagement.

6. In apparatus reproducing sounds inscribed or registered on flexible tape, the combination comprising a frame, a winding reel for the tape journaled in said frame, pulley means rigid with said winding reel, a guide roller for the tape rotatably mounted in said frame, a second pulley means rigid with said guide roller, driving means movably mounted in said frame, means normally urging said driving means to engagement with said second pulley means, motor means for operating said driving means, electromagnetic means for moving said driving means to engage said first pulley means, a tension roller swingably mounted on said frame and forcing the tape against said guide roller, a second winding reel for said tape rotatably mounted in said frame, a clutch having a member rigid with said second reel and a second member driven by said motor means, means for urging said clutch members apart, and means for moving said clutch members to mutual engagement.

SECUNDINO REY.

REFERENCES CITED

The following references are of record in the file of this patent:

FOREIGN PATENTS

| Number | Country | Date |
|---|---|---|
| 590,088 | Germany | Dec. 7, 1933 |